United States Patent [19]

Perr

[11] Patent Number: 4,944,275
[45] Date of Patent: Jul. 31, 1990

[54] FUEL INJECTOR TRAIN WITH VARIABLE INJECTION RATE

[75] Inventor: Julius P. Perr, Columbus, Ind.

[73] Assignee: Cummins Engine Company, Inc., Columbus, Ind.

[21] Appl. No.: 377,319

[22] Filed: Jul. 10, 1989

[51] Int. Cl.$^5$ .............................................. F02M 39/00
[52] U.S. Cl. .................................... 123/501; 123/508; 123/496
[58] Field of Search ............... 123/501, 500, 496, 508, 123/509, 90.61

[56] References Cited

U.S. PATENT DOCUMENTS

| | | | |
|---|---|---|---|
| 1,535,786 | 4/1925 | Morsch | 123/90.61 |
| 1,579,850 | 4/1926 | Wittig | 123/90.61 |
| 1,605,494 | 11/1926 | Anderson | 123/90.61 |
| 1,613,346 | 1/1927 | Davis | 123/90.61 |
| 3,544,008 | 12/1970 | Reiners et al. | |
| 3,557,765 | 1/1971 | Nystrom . | |
| 3,965,875 | 6/1976 | Perr . | |
| 4,206,734 | 6/1980 | Perr | 123/501 |
| 4,467,772 | 8/1984 | Williamson | 123/501 |
| 4,602,597 | 7/1986 | Rhoads . | |

*Primary Examiner*—Carl Stuart Miller
*Attorney, Agent, or Firm*—Sixbey, Friedman & Leedom

[57] ABSTRACT

A fuel injector train having a variable injection rate includes a fuel injector having a plunger and a plunger biasing device having a predetermined spring rate for controlling the injection rate of the injector. A cam assembly is mounted to impart force through a push rod to a rocker arm which communicates the force of the cam assembly to the fuel injector plunger. In some embodiments, the push rod collapses axially a short distance in response to axial force applied thereto. The push rod has an inherent bias against collapsing that is less than the total bias of the injector biasing device so that during a portion of the injection cycle, part of the force imparted to the push rod collapses the push rod to operate the injector at a reduced rate. In another embodiment, the rocker arm is formed with a closable gap between its first and second ends, and the gap has an inherent bias against closing that is less than the total bias of the fuel injector biasing device. During a portion of the injection cycle, part of the force imparted to the rocker arm closes the gap to operate the injector at a reduced rate.

19 Claims, 2 Drawing Sheets

FUEL INJECTOR TRAIN WITH VARIABLE INJECTION RATE

TECHNICAL FIELD

The present invention is directed to a fuel injector train having a variable injection rate. More particularly, the present invention is directed to a fuel injector train having either a rocker arm or push rod incorporating a spring system to vary the injection rate.

BACKGROUND OF THE INVENTION

Internal combustion engine designers have increasingly come to realize that substantially improved fuel supply systems are required in order to obtain higher levels of pollution abatement and increased fuel economy. Among the known options, direct fuel injection appears to be one of the best candidates for achieving improved performance but higher initial costs have tended to discourage its general adoption. This situation is accentuated because only the more sophisticated and more expensive direct injection systems are capable of achieving the increasingly higher performance goals of engine manufacturers.

Until recently, attempts to provide a low cost fuel injection system have tended to center on distributor type fuel injection systems having a single centralized high pressure pump and a distributor valve for metering and timing fuel flow from the pump to each of a plurality of injection nozzles, such as disclosed in U.S. Pat. No. 3,557,765. Although simple in design concept, systems of this type generally suffer defects inherent with separation of the injector nozzles from the centralized pump. Unit injector systems avoid these inherent defects by providing each engine cylinder with its own cam-actuated pump such as disclosed in U.S. Pat. No. 3,544,008. Nevertheless, the performance advantage provided by unit injectors has generally not outweighed the detriment of the greater cost involved except when unit injectors are used for heavy duty compression ignition engine applications. The design of a commercially competitive unit fuel injector therefore normally requires the acceptance of some characteristics which are less than optimal, since the basic injector design goals of low cost, high performance and reliability are often in direct conflict.

As the need for higher engine efficiency and pollution abatement have increased, it has become increasingly evident that some economical means must be provided to vary injector timing in response to changing engine operating conditions. Such control is relatively straight forward in distributor-type fuel injector systems since the injection event is controlled at one central location. However, in unit injector systems, control over injector timing ordinarily requires modification of each individual unit injector, thereby adding significantly to the overall cost of the system.

Fuel injection systems for internal combustion engines that inject fuel into the engine cylinders at a non-uniform rate are well known. One method for varying the injection rate is disclosed in my U.S. Pat. No. 3,965,875, entitled "Fuel Injection System for Diesel Engines." In this patent, I disclose a fuel injector which injects fuel at a relatively slow rate during a first portion of the advancing stroke of the injector plunger and then at a faster rate during a second portion of the injector plunger stroke. During the initial portion of slow injection, an auxiliary coil spring absorbs some of the downward motion of an injector system rocker arm and slows the downward movement of the injector plunger.

U.S. Pat. No. 4,602,597 to Rhodes discloses a spring assisted hydraulic piston cylinder push rod system to vary automatically the valve timing of an internal combustion engine. However, in varying the valve timing, this system uses a restricted oil bleed, similar to conventional push rods having oil bleed holes, to hydraulically vary valve timing. Although this patent discloses a valve timing varying device mounted on a valve push rod, the device is highly complex, relying on a hydraulic, spring-assisted, piston cylinder arrangement that does not appear to be readily adaptable to use with fuel injectors.

A need exists for a simple variable rate fuel injector train that is easy to manufacture and package and that requires a minimal number of added parts to achieve a variable injection rate. Previous coil spring systems incorporating at least one coil spring strong enough to accommodate the loads required for an effective variable injection train spring rate, often include ancillary parts which must be machined to close tolerances. These systems also usually require modification of the plunger component for the fuel injector, and the added parts increase the mass of the injector drive train and require additional packaging.

SUMMARY OF THE INVENTION

It is a primary object of this invention to provide a novel and improved fuel injector train having a variable injection rate wherein the components of the injector train which provide the variable injection rate do not increase the size or mass of the injector train.

Another object of the present invention is to provide a novel and improved fuel injector train having a variable injection rate which includes a modified push rod extending between a cam assembly and a rocker arm for the injector train. The modified push rod is formed to progressively reduce in length in response to an increasing axial force applied thereto which exceeds a predetermined force.

A further object of the present invention is to provide a novel and improved fuel injector train having a variable injection rate which includes a modified rocker arm extending between a push rod for a cam assembly and a spring biased injector plunger. The rocker arm includes a slot which is adapted to progressively close in response to increasing force in excess of a predetermined force applied to at least one end of said rocker arm at a point opposed to the position of said slot.

Yet another object of the present invention is to provide a novel and improved push rod for use in a fuel injector train having an axial bore which receives an elongate, flexible spoke. The axial bore has a cross-section which is greater than the cross-section of the spoke to permit flexure of the spoke within the axial bore. One end of the spoke extends outwardly from the bore when the spoke is unflexed and is retracted toward the bore when the spoke is flexed in response to axial pressure applied to the outwardly extending end thereof.

A further object of the present invention is to provide a novel and improved push rod for use in a fuel injector train having first and second sections which define a central chamber therebetween. The two sections are held in extended relationship by fluid or gas pressure in the chamber, but move axially together in response to axial pressure applied to one end of one of the sections to compress the fluid or gas within the chamber.

A still further object of the present invention is to provide a novel and improved rocker arm for use in a fuel injector train having a slot which is adapted to progressively close in response to increasing force in excess of a predetermined force applied to at least one end of the rocker arm.

These and other objects are achieved by the variable injection rate fuel injector train of the present invention. The fuel injector train includes a fuel injector having a plunger, and a biasing device having a predetermined spring rate for controlling the injection rate of the injector. A cam assembly operates to drive a push rod which in turn drives a rocker arm. The rocker arm communicates the force of the cam assembly to the fuel injector plunger, for the push rod is mounted between the cam assembly and the rocker arm. Either the push rod or the rocker arm are formed to absorb some of the driving force from the cam assembly during a portion of the injector fuel injection cycle.

DETAILED DESCRIPTION OF PREFERRED EMBODIMENTS

Figure 1:
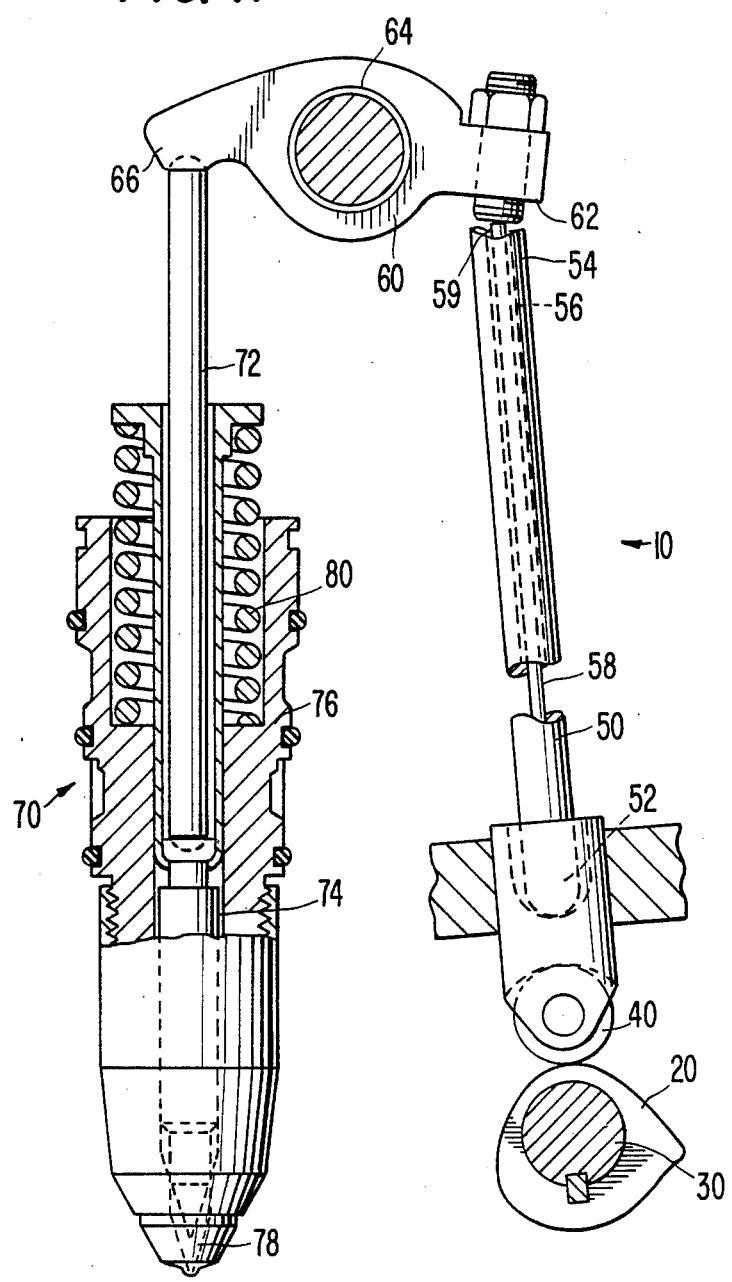
FIG. 1 is a partially sectioned view of an injector train incorporating the push rod of the present invention.

As shown generally in FIG. 1, the fuel injector train 10 of the present invention includes a cam 20 mounted on and keyed to a rotatable cam shaft 30. A cam follower 40 rides on the cam 20, and a push rod 50 is connected to the cam follower 40. Push rod 50 includes a first end 52 connected to cam follower 40 and a second end 54 which contacts a rocker arm 60 at a first end 62 of the rocker arm. Rocker arm 60 is rotatably mounted on a shaft 64 and has a second end 66 connected to a fuel injector indicated generally at 70. Injector 70 includes a plunger 72 having a plunger tip 74 translatably disposed within an injector housing 76. A nozzle 78 is formed at the bottom of the housing 76, and a return spring 80 is mounted around the plunger 72 above the housing 76 to bias the plunger toward its retracted position. To this point, the injector train is conventional.

A push rod 50 formed according to the present invention includes an axial bore 56 in which a small elongate rod or spoke 58 is disposed. Elongate spoke 58 extends from the bottom of axial bore 56 closest to the first end 52 of push rod 50 and through axial bore 56, and includes an outer end 59 which extends out of the axial bore beyond the second end 54 of the push rod 50. This elongate spoke is flexible and has an inherent bias against collapsing that is less than the total bias of the return spring 80 of the injector 70. In collapsing, the elongate spoke 58 may flex and compress, since the diameter of the axial bore 56 is greater than the diameter of the elongate spoke. The spoke is formed of a length of flexible metal or similar flexible material which will flex slightly within the bore.

During one portion of the injection cycle, the entire force transmitted from cam 20 to push rod 50 through cam follower 40 is not transmitted through rocker arm 60 to plunger 72 of injector 70. During this portion of the injector cycle, part of the force imparted to push rod 50 collapses elongate spoke 58, thereby operating injector 70 at a reduced injection rate. After the elongate spoke is completely collapsed, the entire force transmitted to push rod 50 is transmitted to injector 70 to operate the injector at its normal rate. In collapsing, the elongate spoke may buckle at several locations simultaneously. The amount of buckling is governed by the amount permitted by the diameter of the bore 56. When push rod 50 is unloaded, the elongate spoke will straighten and return to its uncollapsed position.

Figure 2:
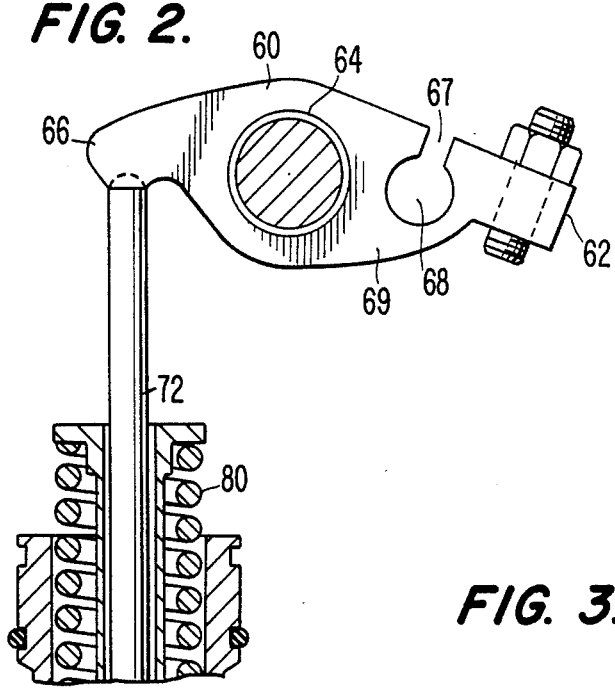
FIG. 2 is a partially sectioned view of a rocker arm formed in accordance with a second embodiment of the present invention.

Similar operational characteristics are achieved by a fuel injector train using a novel rocker arm 60 formed according to the present invention as shown in FIG. 2. Rocker arm 60 is formed to include a gap 67 leading to a biasing hole 68. This biasing hole extends through the rocker arm substantially parallel to the shaft 64, and is positioned between the shaft 64 and either the first end 62 or the second end 66 of the rocker arm. The gap extends downwardly from the top of the rocker arm to the biasing hole. The rocker arm 60 is formed to have an inherent bias against closing gap 67 that is less than the total bias of return spring 80, and the biasing hole 68 facilitates the biasing of rocker arm 60 to close gap 67. In this embodiment, during one portion of the injection cycle, part of the force imparted to rocker arm 60 by the cam 20 and push rod 50 is applied to close gap 67, thereby operating injector 70 at a reduced injection rate. Biasing hole 68 must be selected with a sufficiently large radius to produce only small stress concentrations in rocker arm 60. That is, the larger the biasing hole 68 is, the more the stress is spread out. However, this characteristic must be balanced by the width of a connecting portion 69 of the rocker arm 60. Connecting portion 69 must be sufficiently wide to prevent fatigue and fracture from occurring, so the size of biasing hole 68 is limited by the minimum acceptable width of the connecting portion 69.

The biasing hole 68 and gap 67 must be formed in the rocker arm 60 so that an upward force on the end 62 of the rocker arm will create a force which closes the gap 67. Normally, the biasing hole would be positioned as shown between the shaft 64 and the end 62 of the rocker arm, but a similar reduced injection rate may be achieved by locating the biasing hole between the shaft and the end 66 of the rocker arm.

For some applications it may be beneficial to have the injector train remain rigid at the beginning of an injector cycle and for an injector rate change to occur later in the injector cycle. If the rate change occurs later during the crush portion of the cycle, wear on the injection train will be reduced.

In FIG. 1, the elongate spoke 58 may be made less flexible so that it remains rigid during the initial portion of the injector cycle and does not flex until it is subjected to an increased force later in the injector cycle. Similarly, the biasing hole 68 and slot 67 of FIG. 2 can be formed to compress later in the injector cycle, but it should be noted that once the compression point for the slot 67 or the elongate spoke 58 is set, it cannot be easily varied. Also, it is sometimes difficult to adjust this compression point so that it occurs precisely at the desired time in the injector cycle.

Figure 3:
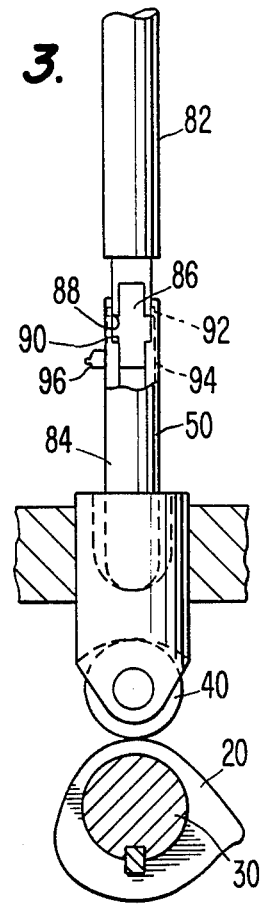
FIG. 3 is a partially sectional view of a third embodiment of the present invention.

In FIG. 3, the push rod 50 is modified to compress at a desired point in the injection cycle. The push rod includes an upper section 82 and a lower section 84 which are formed to compress longitudinally when subjected to force of a predetermined magnitude. The upper and lower sections define an internal enclosed chamber 86 which contains fluid or gas under pressure, and the upper and lower sections will move inwardly toward one another to compress this fluid or gas when subjected to a pressure which exceeds the pressure of the fluid or gas which forces the sections apart. In FIG. 3, the upper and lower sections are shown in the fully extended position before compression occurs. As pressure on the push rod increases, the upper and lower sections telescope until the lower end 88 of the upper section 82 contacts a stop 90 formed on the lower section 84. To limit the upper extent of travel, the upper section may include a pin 92 which rides in a slot shown by broken lines 94 which is formed in the lower section 84.

The fluid or gas under pressure is added to the chamber 86 by means of a connector 96 and operates in the same manner as would a spring between the upper and lower sections. It is possible to vary the pressure in the chamber 86 by means of the connector 96 to change the point in the injection cycle where the two sections begin to move together.

The upper and lower rod sections 82 and 84 and the chamber 86 are normally formed in the push rod 50 as shown in FIG. 3, but they could be formed instead in the plunger 72. Also, seals (not shown) are provided to seal the fluid or gas pressure within the chamber 86.

The variable rate fuel injector trains of FIGS. 1, 2 and 3 are superior to known designs. These embodiments are much simpler structures which require a minimum of machining and fabrication effort. As push rods 50 are ordinarily made hollow for weight conservation, virtually no additional fabrication of existing parts is required to fabricate the unit of FIG. 1. All that need be done is to insert an elongate spoke into the hollow push rod. Where the push rod is not hollow, hollowing it out is a relatively simple process—much easier than machining the close tolerances required for a spring-actuated piston cylinder arrangement.

Forming a gap in the rocker arm 60 is likewise a relatively simple process, so both of the embodiments of FIGS. 1 and 2 are relatively inexpensive to fabricate. In both of these embodiments, the modified push rod or rocker arm may be used with existing fuel injectors, obviating the need to disturb the most delicate and complicated element of the injector train. Also, in both embodiments, the system is less sensitive and susceptible to train wear because the load changes less.

Finally, and possibly most importantly, because of the geometry of the push rod and rocker arm, and because the fuel injector does not use extra elements exterior to its housing, the present invention provides a space saving compared to known devices. As is appreciated in the art, space considerations for internal combustion engines are of primary importance. Any space savings that can be achieved without prohibitive expense are highly desirable.

Figure 4:
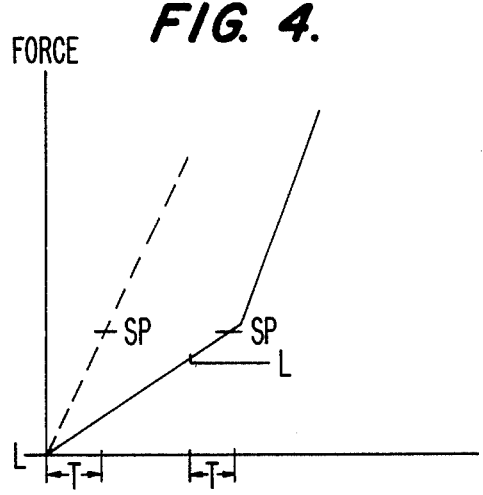
FIG. 4 is a graph showing the train wear characteristics of conventional injector systems and the fuel injector train of the present invention.

FIG. 4 graphically compares the train wear for the injector train of the present invention with that of injector trains not having a variable injection rate. The characteristics of the present invention are shown in solid line, while the characteristics of nonvariable injector trains are shown by the broken lines. The interference caused by pre-loading the plunger 72 multiplied by the spring rate of the fuel injector train 10 equals the set load SP on the injector train at the end of the injection cycle. For an amount of train wear T, the set load SP moves to point L in FIG. 4. Since the injector train 10 of the present invention operates at some point in the injection cycle at a reduced injection rate, there is less wear on the injector train components.

INDUSTRIAL APPLICABILITY

The fuel injector train having an improved push rod or improved rocker arm for varying the injection rate find application in a large number of internal combustion engine fuel injection systems. Because of the ease of manufacture and relatively inexpensive cost of the push rods and rocker arms, and because of the space savings attained, these injector trains are particularly useful with small vehicular engines.

I claim:

1. A fuel injection train for injecting fuel at a reduced rate during a portion of a fuel injection cycle comprising:
    a fuel injector having a plunger and plunger biasing means having a predetermined spring rate for biasing the plunger to control the injection rate of the injector,
    a rocker arm for applying force to said plunger in response to force applied thereto,
    cam assembly means,
    and an elongate push rod means mounted between said cam assembly means and said rocker means, said cam assembly means operating to apply force to said push rod means to cause said push rod means to apply force to said rocker arm,
    said push rod means including a first end in contact with said rocker arm, a second end in contact with said cam assembly means, and push rod biasing means between said first and second ends, said push rod means operating in response to an axial force applied thereto which is in excess of a predetermined force to allow movement of said first and second ends for a limited distance toward one another against the bias of said push rod biasing means,
    said push rod biasing means further including means for varying the bias thereby varying the predetermined force required to cause movement of said first and second ends toward one another and changing the point in the injection cycle at which the first and second ends begin to move toward one another, thereby varying the point in the field injection cycle in which the injector injects fuel at a reduced rate.

2. The fuel injection train of claim 1 wherein the bias of said push rod biasing means is less than the total bias of said plunger biasing means.

3. A fuel injection train for injecting fuel at a reduced rate during a portion of a fuel injection cycle comprising:
    a fuel injector having a plunger and plunger biasing means having a predetermined spring rate for biasing the plunger to control the injection rate of the injector;
    a rocker arm for applying force to said plunger in response to force applied thereto;
    cam assembly means;
    an elongate push rod means mounted between said cam assembly means and said rocker arm, said cam assembly means operating to apply force to said push rod means to cause said push rod means to apply force to said rocker arm;

said rocker arm means including a first end in contact with said rocker arm, a second end in contact with said cam assembly means, and push rod biasing means between said first and second ends, said push rod means operating in response to an axial force applied thereto which is in excess of a predetermined force to allow movement of said first and second ends for a limited distance toward one another against the bias of said push rod biasing means;

wherein said push rod means imparts substantially all of the force imparted thereto by said cam assembly means to said rocker arm when said first and second ends have moved toward one another for said predetermined distance;

said push rod means including an elongate body having said first end formed at one end thereof and a bore end opposite to said first end, an axial bore extending from said bore end into said body and an elongate flexible spoke means disposed within said axial bore and having an outer end extending outwardly beyond said bore end for a predetermined distance to form the second end of said push rod means, said axial bore having a cross-section which is greater than the cross-section of said elongate flexible spoke means by an amount sufficient to permit limited flexure of said spoke means within the axial bore in response to an axial force in excess of said predetermined force to cause said second end to move inwardly toward said bore end.

4. The fuel injection train of claim 3 wherein said axial bore is formed to permit said spoke means to flex to an extent wherein said second end does not extend outwardly of said elongate body beyond said bore end.

5. The fuel injection train of claim 4 wherein said elongate spoke means has an inherent bias opposing the flexure thereof which forms said push rod biasing means, said inherent bias operating to return said spoke means to an unflexed state when the axial force applied to said push rod means drops below said predetermined force.

6. The fuel injection train of claim 5 wherein said inherent bias of said spoke means opposing said flexure is less than the total bias of said plunger biasing means.

7. The fuel injection train of claim 1 wherein said push rod means includes a first section having said first end, a second section having said second end, said first and second sections having internal ends opposite said first and second ends which are telescoped together for limited axial movement between an extended and a retracted position, and a pressure chamber means mounted between said internal ends, said pressure chamber means adapted to be pressurized for applying pressure to said internal ends to bias said internal ends in the extended position, said internal ends being moved to the retracted position against the pressure from said pressure chamber means in response to an increasingly axial force applied to said push rod means in excess of said predetermined force said means for varying the bias including a connector in communication with said pressure chamber to vary the pressure within said pressure chamber, thereby varying the bias of said push rod biasing means.

8. A push rod for use in operating a fuel injector of a fuel injector train at a reduced injection rate during a portion of a fuel injection cycle wherein the fuel injector train includes a fuel injector having a plunger and plunger biasing means having a predetermined spring rate for biasing the plunger to control the injection rate of the injector, said push rod comprising an elongate body having a first end and a second end, an axial bore extending from at least said second end into said body, an elongate, flexible spoke means disposed within said axial bore and having a spoke outer end extending outwardly of said elongate body from the second end for a predetermined distance, the axial bore having a cross-section which is greater than the cross-section of said elongate flexible spoke means by an amount sufficient to permit flexure of said spoke means within the axial bore in response to a predetermined axial force applied to the spoke outer end to cause said spoke outer end to move inwardly toward the second end of said elongate body, said elongate spoke means having an inherent bias opposing said flexure which returns said elongate spoke means to an unflexed state when the predetermined axial force is removed from the outer end thereof.

9. The push rod of claim 8 wherein said axial bore is formed to permit said spoke means to flex to an extent wherein the spoke outer end does not extend outwardly of said elongate body.

10. The push rod of claim 8 wherein the inherent bias of said spoke means opposing said flexure is less than the total bias of the plunger biasing means.

11. A fuel injection train for injecting fuel at a reduced rate during a portion of a fuel injection cycle comprising:

a fuel injector having a plunger and plunger biasing means having a predetermined spring rate for biasing the plunger to control the injection rate of the injector, a rocker arm for applying force to said plunger in response to force applied thereto, a cam assembly means, and an elongate push rod means mounted between said cam assembly means and said rocker arm, said cam assembly means operating to apply force to said push rod means to cause said push rod means to apply force to said rocker arm, said rocker arm having a first end and a second end and being mounted for pivotal movement about a pivot point between said first and second ends, a slot means formed in said rocker arm between said first and second ends which at least partially closes in response to force applied to the rocker arm in excess of a predetermined force, said slot means being formed in said rocker arm to have an inherent bias against closure so that once said predetermined force is exceeded, the force operates to at least partially close said slot means.

12. The fuel injection train of claim 11 wherein the bias against closure of said slot means is less than the total bias of said plunger biasing means.

13. The fuel injection train of claim 11 wherein said rocker arm applies substantially all of the force applied thereto to said plunger once said slot means is closed.

14. The fuel injection train of claim 11 wherein said push rod means applies force to said rocker arm at the first end thereof, said rocker arm operating in response to force from said push rod means to apply force to said plunger at the second end of said rocker arm.

15. The fuel injection train of claim 14 wherein said rocker arm includes a bottom surface extending between said first and second ends and a top surface extending between said first and second ends, said push rod means and plunger contacting said bottom surface and said slot means being formed to extend inwardly from said top surface.

16. The fuel injection train of claim 15 wherein said slot means is spaced between said first end and said pivot point.

17. A rocker arm for use in operating a fuel injector of a fuel injector train at a reduced injection rate during a portion of a fuel injection cycle wherein the fuel injector train includes a fuel injector having a plunger and plunger biasing means having a predetermined spring rate for biasing the plunger to control the injection rate of the injector, said rocker arm comprising an elongate body member having a first end, a second end, a pivot point between said first and second ends and spaced therefrom and a slot means formed in said body between said first and second ends which operates in response to increasing force applied to the rocker arm in excess of a predetermined force to close, said slot means being formed in said body to have an inherent bias against closure.

18. The rocker arm of claim 17 wherein the bias against closure of said slot means is less than the total bias of said plunger biasing means.

19. The rocker arm of claim 18 wherein said rocker arm includes a bottom surface extending between said first and second ends and a top surface extending between said first and second ends, said slot means extending inwardly from said top surface transversely to said top and bottom surfaces

* * * * *